UNITED STATES PATENT OFFICE.

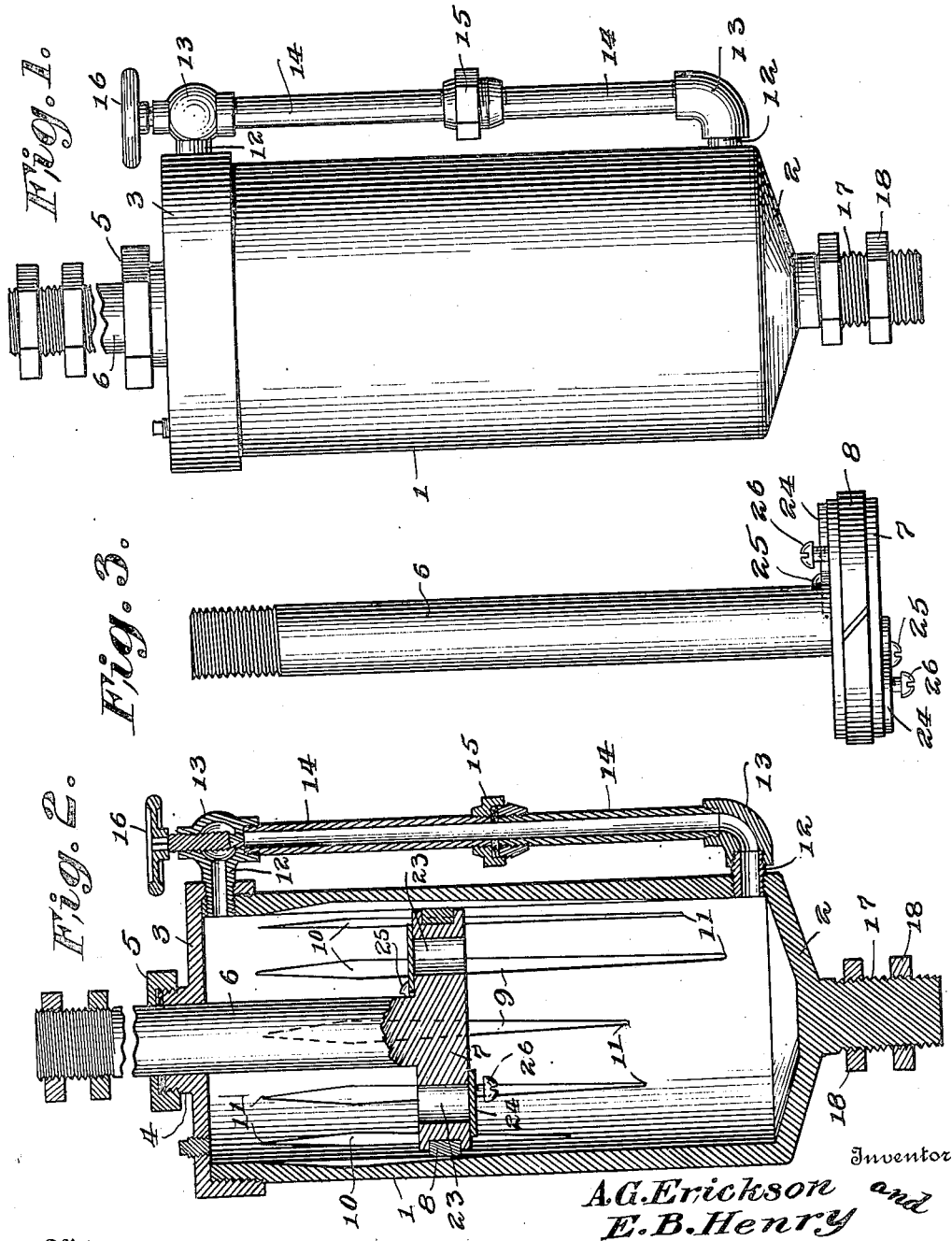

AXEL G. ERICKSON AND EDWARD B. HENRY, OF BANDON, OREGON.

SHOCK-ABSORBER FOR VEHICLES.

1,216,221.  Specification of Letters Patent.  Patented Feb. 13, 1917.

Application filed May 24, 1916. Serial No. 99,583.

*To all whom it may concern:*

Be it known that we, AXEL G. ERICKSON and EDWARD B. HENRY, citizens of the United States, residing at Bandon, in the county of Coos and State of Oregon, have invented new and useful Improvements in Shock-Absorbers for Vehicles, of which the following is a specification.

This invention relates to shock absorbers for vehicles, the same being especially designed for use in connection with motor vehicles.

The object of the invention is to produce a particularly effective shock absorber involving the use of an oil or liquid cushion, combined with means whereby the shock absorber as a whole may be regulated to cushion the vehicle body in accordance with the load imposed thereon.

Another object of the invention is to provide a shock absorber of the type above referred to which is perfectly reliable in operation, it cannot get out of order and which at the same time, as above indicated, is capable of being adjusted or regulated to different vehicles and vehicles designed for greater or less loads.

With the above and other objects in view, the invention consists in the novel construction, combination and arrangement of parts, as herein described, illustrated and claimed.

In the accompanying drawings:—

Figure 1 is a side elevation of one of the shock absorbers of this invention.

Fig. 2 is a longitudinal diametrical section through the same.

Fig. 3 is a detail view of the piston and piston rod detached.

Figure 4:
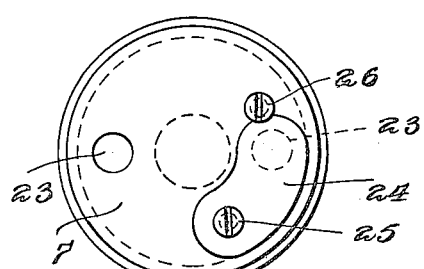
Fig. 4 is a plan view of the piston looking toward one face thereof.

In carrying out this invention, we employ a hollow cylindrical liquid container 1 which is ordinarily filled with oil, light or heavy as may be found expedient. The cylinder is shown as provided at one end with a permanent closure or head 2 and at the opposite end with a head 3 which is flanged and threaded to be screwed upon the corresponding end of the cylinder 1 as illustrated in Fig. 2.

The head 3 is provided with an externally threaded neck 4 upon which is screwed the gland 5 of a stuffing box through which works a piston head 6 having fixedly attached thereto a piston 7 which is peripherally grooved to receive a split packing ring 8 which works in contact with the inner wall of the cylinder 1. The inner wall of the cylinder is formed with oil ways or grooves 9 each groove being of varying width between the opposite extremities thereof. The widest point of each groove is indicated at 10 and is much nearer one head of the cylinder than the other. From such widest point 10, each groove tapers gradually and progressively narrows until it terminates in a vanishing point 11 at both ends. It will also be observed that the grooves or oil ways 9 are of different lengths so that the movement of the piston toward the head of the cylinder will be progressively resisted, the resistance to the piston increasing as the latter approaches either head of the cylinder.

Extending laterally from the cylinder 1 adjacent to the opposite ends thereof are threaded nipples 12 to which are connected elbows 13. Threaded into said elbows are pipe connections 14 the adjacent ends of which are threaded to receive a union 15. The construction just described constitutes a by-pass between the ends of the cylinder and the spaces at opposite sides of the piston 7. The flow of oil or other liquid through said by-pass is controlled and regulated by means of an adjusting screw 16 which may be opened or closed more or less for the purpose stated. Extending from the head 2 on the cylinder is a threaded stud or shank 17 having a plurality of nuts 18 thereon to engage the angle arm 19 of a suitable hanger 20 fastened to the vehicle. The rod 6 is inserted through a hole in the angle arm 21 of another hanger 22 also fastened to the vehicle. It is to be understood that one of the hangers is fastened to the top portion of one of the springs between the body and the axle or to the body itself, while the other hanger is connected to the lower portion of the vehicle spring or to the axle, the shock absorber as a whole being thus interposed between the body and the axle for the purpose of cushioning, checking and absorbing the relative movement between the wheel base and the body of the vehicle, relieving the springs and increasing the life and durability of the car as a whole as well as adding to the comfort and enjoyment of the passengers.

Figure 5:
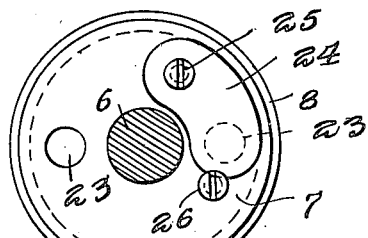
Fig. 5 is a similar view looking toward the opposite face of the piston.
Figure 6:
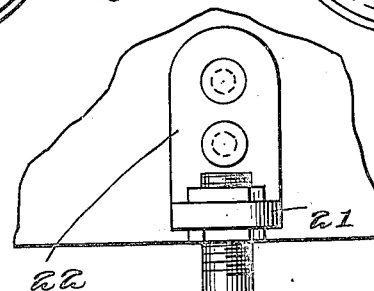
Fig. 6 is an elevation on a reduced scale showing one of the shock absorbers in its applied relation to a motor vehicle.

A portion of the liquid contained in the tank 1 is adapted to pass directly through the piston 7, the latter for that purpose being formed with ports 23 which are normally covered by arcuate valves 24 one of which is arranged on one side face of the piston while the other is arranged on the opposite side face of the piston as indicated in Figs. 3, 4 and 5. Each valve 24 is connected at one end to the face of the piston by means of a fastener 25 while the amplitude of movement of the opposite or free end of the valve is regulated by means of a stop in the form of a screw 26 threaded into the adjacent face of the valve, the head of the screw 26 acting as a stop for limiting the movement of the valve 24 away from the face of the piston.

In view of the foregoing description, taken in connection with the accompanying drawings, it will now be observed that there is always present in the shock absorber means for permitting the liquid to pass from one side of the piston to the other, this being accomplished irrespective of the by-pass above referred to and the valves carried by the piston. Where the constantly active liquid transferring means are not sufficient to give the required celerity of movement to the piston, the headed screws or stops 26 may be adjusted so as to allow the desired amount of liquid to pass through the ports 23 of the piston. In addition to this, the screw or valve 16 may be adjusted to permit a certain predetermined or necessary quantity of the cushioning liquid to move back and forth through the by-pass above described. By means of these three adjustments, the shock absorber as a whole is adapted to vehicles from the heaviest to the lightest type and also provides for the necessary adjustment essential to the economical and comfortable transportation of passengers and the like.

It will of course be obvious that the shock absorber hereinabove described may be used in connection with any kind of vehicle and also that the by-pass may be formed as an integral part of the cylinder in accordance with the will of the manufacturer.

We claim:—

In a shock absorber, the combination of a liquid containing cylinder formed in the inner wall thereof with longitudinally extending grooves, each groove having the greatest transferring capacity at a point nearer one end of the cylinder than the other and the portions at each side of said widest point tapering in opposite directions toward the ends of the cylinder, heads closing the ends of said cylinder, a piston rod operating through one head of the cylinder, a piston fast on said rod and movable back and forth lengthwise of said cylinder, said piston being formed with a plurality of ports extending therethrough from one face to the other, valves carried by the opposite faces of said piston controlling said ports and movable in opposite directions, and stops adjustable in relation to the opposite faces of the piston for regulating the amplitude of movement of said valves in relation to the piston.

In testimony whereof we affix our signatures.

AXEL G. ERICKSON.
EDWARD B. HENRY.

Attest:
FRANK A. HOLMAN,
RICHARD WATSON.